United States Patent [19]

Upmeier et al.

[11] 3,966,377

[45] June 29, 1976

[54] BLOWHEAD FOR TUBULAR FILM

[75] Inventors: Hartmut Upmeier, Tecklenburg; Werner-Josef Zimmermann, Lengerich, both of Germany

[73] Assignee: Windmoller & Holscher, Lengerich, Germany

[22] Filed: Apr. 17, 1974

[21] Appl. No.: 461,799

[30] Foreign Application Priority Data

Apr. 24, 1973 Germany............................ 2320687

[52] U.S. Cl.............................. 425/72 R; 264/98; 425/133.1; 425/133.5; 425/326 R
[51] Int. Cl.².......................................... B29D 7/02
[58] Field of Search.............. 425/144, 326 R, 461, 425/376, 387 R, 380, DIG. 2, DIG. 208, 114, 131.1, 133.1, 72, 133.5; 264/98

[56] References Cited

UNITED STATES PATENTS

| | | | |
|---|---|---|---|
| 3,647,339 | 3/1972 | Upmeier............................ | 425/326 |
| 3,649,143 | 3/1972 | Papesh et al......................... | 425/114 |
| 3,694,292 | 9/1972 | Schippers et al. .................. | 425/236 |

FOREIGN PATENTS OR APPLICATIONS

| | | | |
|---|---|---|---|
| 1,927,733 | 2/1971 | Germany......................... | 425/326 R |

*Primary Examiner*—Francis S. Husar
*Assistant Examiner*—Robert J. Charvat
*Attorney, Agent, or Firm*—Fleit & Jacobson

[57] ABSTRACT

In a blow-head for producing tubular film from thermoplastic molten material and comprising a housing with a central supply conduit for the molten material, distributing passages radiating from the supply conduit to a respective distributing helix of an insert member, and means for internally cooling the blown film, said cooling means comprising concentric air inlet and outlet passages extending axially of the housing and each connected to at least one inlet tube and one outlet tube, respectively, the said tubes being disposed between adjacent said radiating distributing passages and extending to the exterior of the housing, provision is made for forming the film of at least two layers having different properties by making the said insert member tubular and providing in it at least one coaxial further insert formed with further distributing helices each of which is fed with further molten material from a further supply conduit through further distributing passages, the said insert member terminating in an annular flow divider adjacent an annular outlet nozzle in the housing for all the molten material.

4 Claims, 4 Drawing Figures

BLOWHEAD FOR TUBULAR FILM

The invention relates to an improvement in or modification of the blow-head for producing tubular film from thermoplastic molten material as described in our U.S. Patent Application No. 441,753, now Patent No. 3,390,768. (U.K. application No. 4044/74 corresponding to German application No. 2306834.0), hereinafter referred to as the parent application.

According to said parent application, the blow-head comprises a housing with a central supply conduit for the molten material, distributing passages which radiate from the supply conduit and each open into a respective distributing helix of an insert member which forms with the housing an overflow gap that increases in size, and means for internally cooling the blown film, said cooling means comprising concentric air inlet and outlet passages extending axially of the housing and each connected to at least one inlet tube and one outlet tube, respectively, the said tubes being disposed between adjacent said radiating distributing passages and extending to the exterior of the housing.

The distributing passages may be formed in an obtuse-angled conical surface, the inlet and outlet tubes extending substantially normal to said conical surface and thus having their longitudinal axes disposed on an imaginary acute-angled conical surface. By forming the distributing passages in an obtuse-angled conical surface, inlet and outlet tubes of large diameter can be employed even for blow-heads of small nominal size.

The present invention aims to retain the advantages of the blow-head according to the parent application but to adapt it for the manufacture of multi-ply tubular film. Such film comprises two or more concentric layers in which the plastics material is of different composition or of different colouring. With the high production rates that are desired by industry, difficulties are encountered in charging the blow-head with the different molten materials and particularly in leading the different materials through the blow-head without giving rise to wrong thickness tolerances for the individual layers of the film. These difficulties could hitherto not be overcome satisfactorily with conventional blow-heads which, for example, have laterally-fed annular distributing passages for the molten materials.

According to the present invention, the blow-head of the parent application is suitably modified by making the insert member tubular and providing in it at least one coaxial further insert formed with a further distributing helix that is fed with further molten material from a further supply conduit through further distributing passages, the said insert member terminating in an annular flow divider adjacent an annular outlet nozzle in the housing for all the molten material.

By arranging the flow paths in accordance with the present invention, close thickness tolerances are possible for each layer or ply of the tubular film even at high output rates. In effect, the invention provides two or more similar passage systems which are coaxially inter-nested.

It is of particular advantage if an even number of the distributing passages and an equal number of said further distributing passages are formed in respective obtuse-angled conical surfaces which are substantially parallel to one another.

It will now be evident that the or each further insert having a distributing helix fed with further molten material serves to produce an inner layer of the tubular film. The or each further supply conduit may enter the housing normal to the conical surfaces of both inserts whilst the supply conduit for the molten material forming the outer layer is introduced centrally of the blow-head housing. On the other hand, it is also possible that both or all the supply conduits enter the housing centrally and coaxially through an adaptor which receives the molten material and further molten material laterally.

Examples of the invention will now be described with reference to the accompanying drawings, wherein.

Figure 1:
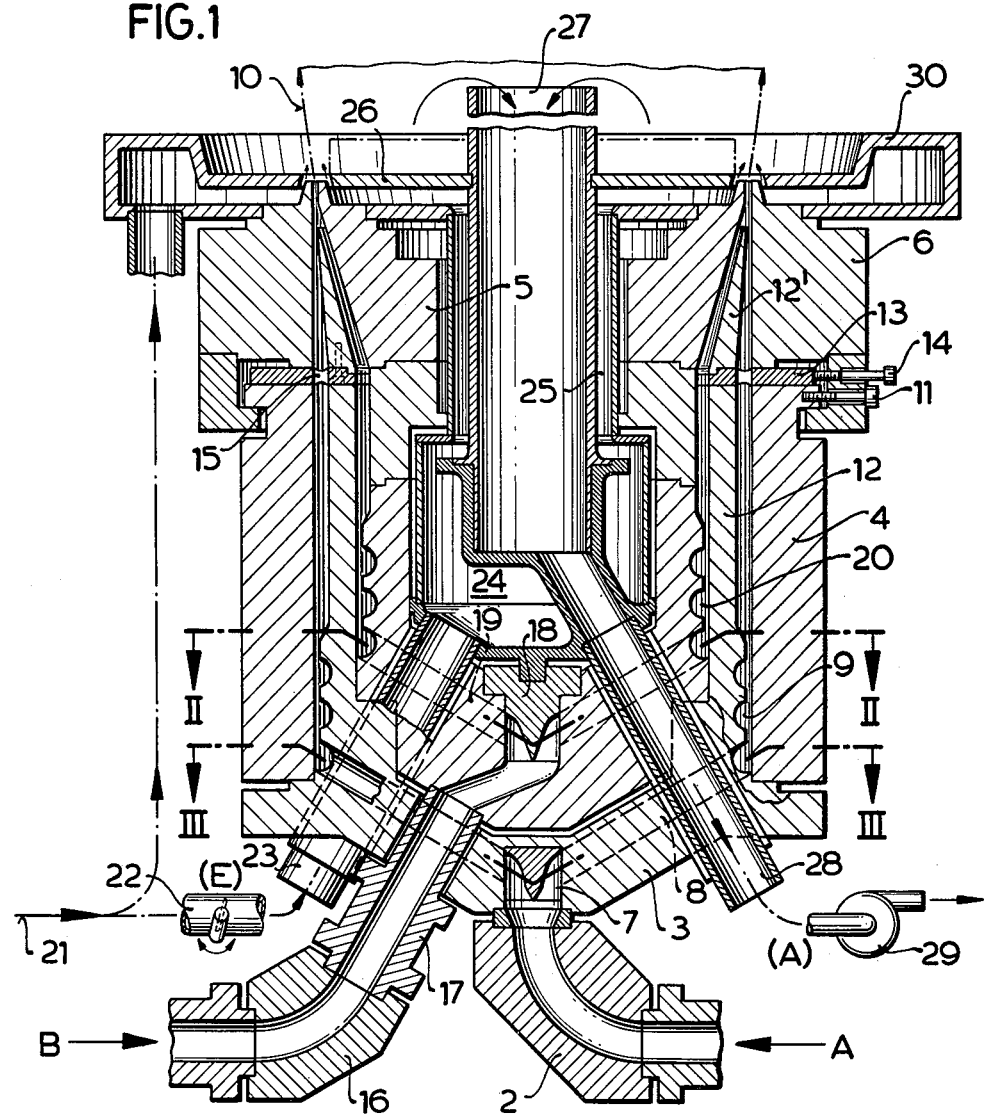
FIG. 1 is a cross-section through a blow-head for producing two-ply tubular film.

Referring to FIG. 1, an extruder (not shown) delivers molten thermoplastic material, through a connecting member 2 having a curved bore, in the direction of the arrow A to a distributing member 3 of a blow-head housing 4. The housing is equipped with nozzle rings 5 and 6 between which the plastics material is injected to form a blow bubble 10. The molten material entering through the connector 2 is destined to form an outer ply of the blown tubular film. Blades 7 provided in the distributing member 3 divert the molten material into distributing passages 8 formed in the surface of an obtuse-angled cone. The distributing passages open into respective distributing helices 9 out of which the molten material passes from the initially circumferential flow to axially directed flow towards the nozzle orifice. The bubble 10 of blown film is taken off in conventional manner, flattened and coiled. The distributing helices 9 are formed in a tubular insert member 12 which terminates near the outlet nozzle in an annular flow divider 12'.

Further molten material for an inner ply of the blown film is supplied by a different extruder in the direction of the arrow B, through a connecting member 16 having a curved bore, through a rectilinear supply conduit 17, to a deflecting blade 18 which diverts the further molten material into further distributing passages 19 formed in the surface of an obtuse-angled cone that is parallel to the cone in which the distributing passages 8 are formed. The distributing passages 19 open into respective distributing helices 20 in a further insert member 5 contained within the tubular insert 12. The insert members 5 and 12 together define an ever-increasing gap and thus the further molten material also passes from initially circumferential flow to axially directed flow as it reaches the nozzle orifice along the annular flow divider 12'. As shown in the drawing, the supply conduit 17 for the further molten material extends substantially normal to the aforementioned obtuse-angled cones.

To adjust the thickness of the entire blown tubular film, the outer nozzle ring 6 is radially displaceable in relation to the inner nozzle ring 5 with the aid of set screws 11. Adjustment of the inner and outer film layers relatively to one another is made possible by radial displacement of the flow divider 12' with the aid of a supporting plate or spider 13 that co-operates with set screws 14. Since the flow divider 12' is supported by the nozzle rings 5 and 6, no marked axial loads are exerted on the spider 13 and therefore the lengths of the individual arms 15 of the spider can be kept very short in the direction of flow. This is of advantage in minimising flow markings caused by the arms 15.

For the exterior cooling of the blown film there is a cooling ring 30 to which air is supplied in the direction of the arrow 21. Through a branch conduit fitted with a throttle 22, air is supplied from the same source for the internal cooling of the blown film. The internal cooling air is fed to a collecting chamber 24 through inlet tubes 23 and passes through an annular air inlet passage 25 to an internal cooling ring 26 at which the air enters the blown film. The heated internal cooling air is discharged through an air outlet passage that preferably extends upwardly right up to a level at which the blown film is flattened. This air outlet passage is defined by a pipe 27 extending concentrically through the inlet passage 25 and leading to air outlet tubes 28. The heated air is passed through the pipe 27 and tubes 28 by means of a suction fan 29. Since the blow-head is provided with a plurality of the tubes 23 and 28 (which are also indicated by the respective reference letters E and A), the blow-head also comprises distributing and collecting tubes for respectively distributing and collecting the stream of air but these distributing and collecting tubes are not illustrated.

The air inlet and outlet tubes 23, 28 extend substantially perpendicular to the conical surfaces in which the distributing passages 8 and 19 are formed, the tubes being provided in an alternating arrangement. The outlet tubes 28 constitute the diverging branches of a breeches pipe of which the leg is the pipe 27, the centre lines of the pipes 23 and 28 being disposed on an acute-angled conical surface.

It will be evident from FIG. 1 that the air tubes 23 and 28 open to the exterior of the blow-head housing in the vicinity of the connecting member 2. They can be readily connected to spiral hoses without danger of the latter becoming damaged by touching the hot parts of the blow-head.

Figure 2:
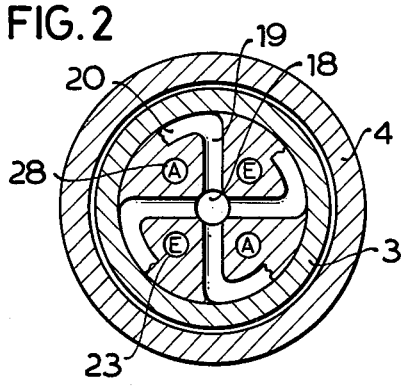
FIG. 2 is a section on the line II—II in FIG. 1 but taken through an embodiment employing four distributing helices for the plastics material and four air tubes.
Figure 3:
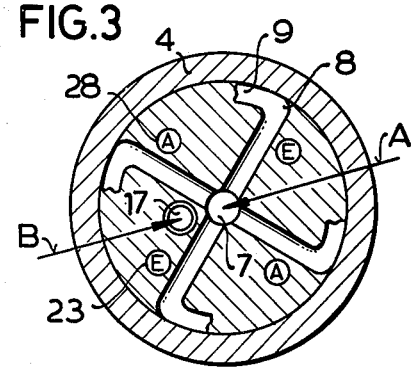
FIG. 3 is a section on the line III—III in FIG. 1 taken through the lower group of distributing passages.

FIG. 2 diagrammatically indicates the symmetrical alternate arrangement of the air inlet and outlet tubes in relation to the distributing passages for molten material in the distributing member 3, the illustrated construction employing a total of four tubes 23, 28 and four distributing passages 19. FIG. 3 shows how the distributing passages 8 are disposed close to the air tubes 23, 28 which, at the level of the FIG. 3 cross-section, are of course at a wider spacing from one another than at the level at which the FIG. 2 cross-section is taken. FIG. 3 also shows that the supply conduit 17 for the further molten material passes substantially normal to the conical surface in which the distributing passages 8 are formed and is located on the angular bisector of one of the distributing passages 8 and one of the air inlet tubes 23.

By providing the distributing passages 8 and 19 and the air tubes 23 and 28 along respective cones that are substantially normal to one another, the basic dimensions of the blow-head housing (diameter and height) can be influenced within a comparatively wide range by appropriately selecting the angles of the cones, thereby permitting the tubes 23, 28, which have as large a cross-section as possible, to be accommodated between the distributing helices 9 and 20 and the distributing blade 18.

As in the case of our parent application, for blowheads having a large nominal size the number of distributing passages and air tubes can be increased by an even numbered multiple (2, 4, 6, 8 times etc.). Similarly, when making films having three plies, or even more plies in a case where adhesion-enhancing layers are provided between plies of thermoplastic material that would otherwise be difficult to bond to one another, one or more additional insert members containing distributing helices may be provided coaxially within the illustrated two insert members. The supply conduits (such as 17) for the additional insert members would then be accommodated in those segments between the distributing passages 8 that are left unoccupied in the FIG. 3 embodiment.

Figure 4:
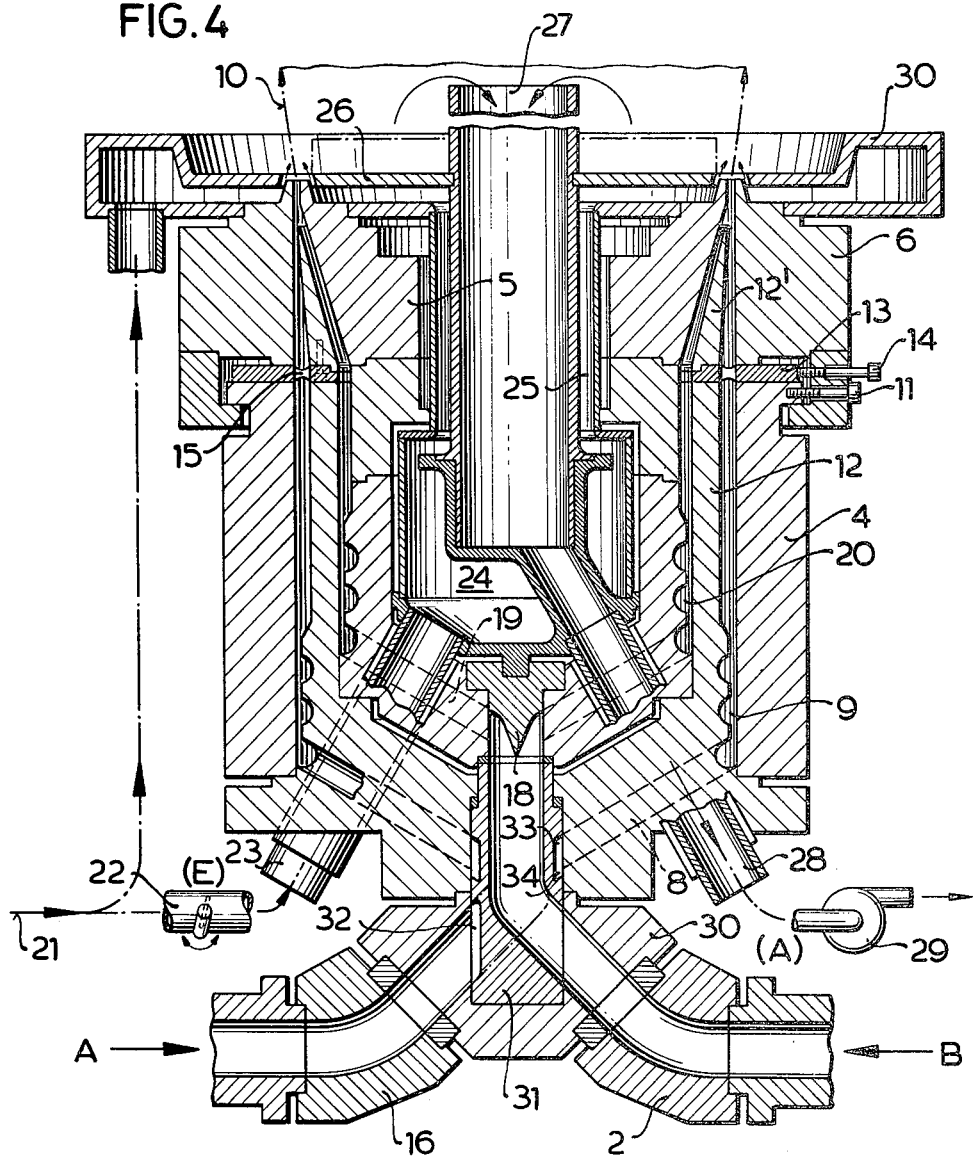
FIG. 4 is a cross-section through a blow-head showing a modified arrangement of supply conduits for the molten material.

As shown in FIG. 4, the supply of the molten material for the individual plies of the tubular film that is to be blown can be modified. In this case, the supply conduit 17 of FIG. 1 directed obliquely to the deflecting blade 18 is dispensed with. Instead, both flows of molten material are introduced centrally of the blow-head housing from a lateral direction (see arrows A and B) through the connectors 16 and 2 which are coupled to an adaptor 30. The molten material for the inner layer of the tubular film preferably passes through an inner conduit formed in an insert 31 of the adaptor 30 whilst the molten material for the or each outer layer is divided by a flow blade 32 (which is known per se) and passes through a concentric chamber 33 and flow blades 34 to the various distributing passages 8. The adaptor 30 can be readily modified for receiving a third or more streams of molten material.

We claim:

1. A blow-head for producing tubular film from thermoplastic molten material comprising, a tubular housing having an interior and an annular outlet nozzle for molten material, a first tubular insert having a conically shaped bottom wall disposed within said housing interior, said first insert having a side wall provided with a helical groove on the outer surface thereof adjacent said bottom wall, said first insert side wall defining with the inner surface of said housing a first flow passage for said molten material, said first flow passage having a helical lower portion defined by said groove and a tubular upper portion, a plurality of circumferentially spaced, radially extending first distributing passages in said first insert bottom wall, said first distributing passages having axially disposed inner ends and outer ends communicating with said helical portion of said first flow passage, a first supply conduit for molten material communicating with the inner ends of all of said first distributing passages, a second tubular insert having a conically shaped bottom wall disposed within the interior of said first inert, said second insert having a side wall provided with a helical groove on the outer surface thereof adjacent said bottom wall, said second insert side wall defining with the inner surface of said first insert a second flow passage for said molten material, said second flow passage having a helical lower portion defined by said groove and a tubular upper portion, said tubular upper portions of said first and second flow passages converging together at said annular outlet nozzle to form a two-ply plastic film, a plurality of circumferentially spaced, radially extending second distributing passages in said second insert bottom wall, said second distributing passages having axially disposed inner ends and outer ends communicating with the helical portion of said second flow passage, a second supply conduit for molten material communicating with the inner ends of all of said second distributing passages, coaxially extending air inlet and outlet means within said housing including at least one air inlet tube extending through the bottom walls of said first and second inserts and at least one outlet tube extending through the bottom walls of said first and second inserts, said inlet and outlet tubes disposed between said first and second distributing passages and extending to the exterior of said housing.

2. A blow-head according to claim 1 wherein an even and equal number of said first and second distributing passages are provided and wherein said first and second distributing passages are disposed in substantially parallel relationship.

3. A blow-head according to claim 2 wherein said second supply conduit is disposed in perpendicular relationship to the conical outer surfaces of said first and second inserts.

4. A blow-head according to claim 1 including an adapter on said housing communicating with one of said plurality of first and second distributing passages, and wherein said first and second supply conduits extend through said adapter centrally and coaxially with respect to said housing.

* * * * *